2 Sheets—Sheet 2.

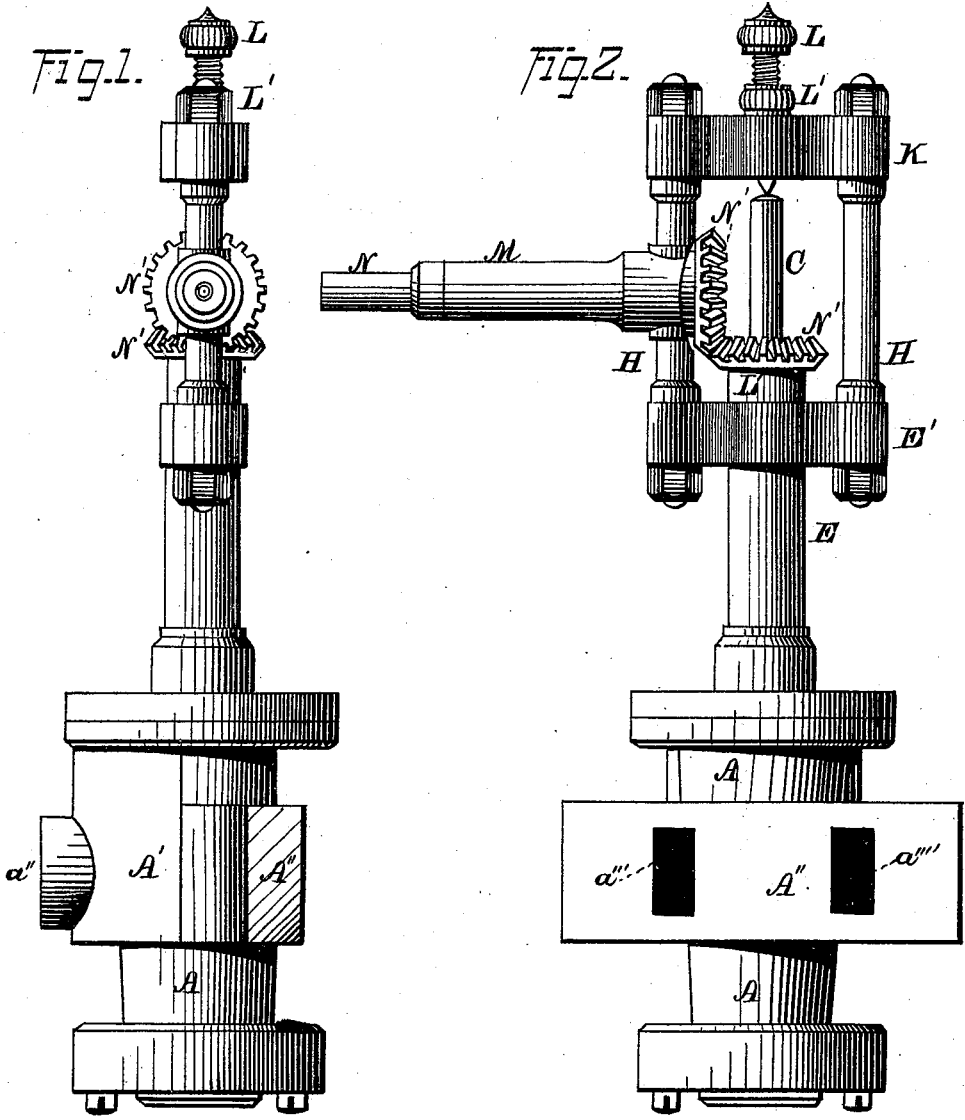

J. F. SWEET.
ROTARY-VALVE.

No. 173,084. Patented Feb. 1, 1876.

WITNESSES:
Jas. K. Hutchinson
John R. Young

INVENTOR-
Jno. F. Sweet, by
Prindle and Ry his Attys

UNITED STATES PATENT OFFICE.

JOHN F. SWEET, OF CEDAR RAPIDS, IOWA.

IMPROVEMENT IN ROTARY VALVES.

Specification forming part of Letters Patent No. 173,084, dated February 1, 1876; application filed August 14, 1875.

*To all whom it may concern:*

Be it known that I, JOHN F. SWEET, of Cedar Rapids, in the county of Linn and in the State of Iowa, have invented certain new and useful Improvements in Balanced Valves; and do hereby declare that the following is a full, clear, and exact description thereof, reference being had to the accompanying drawings, making a part of this specification, in which—

Figure 3:
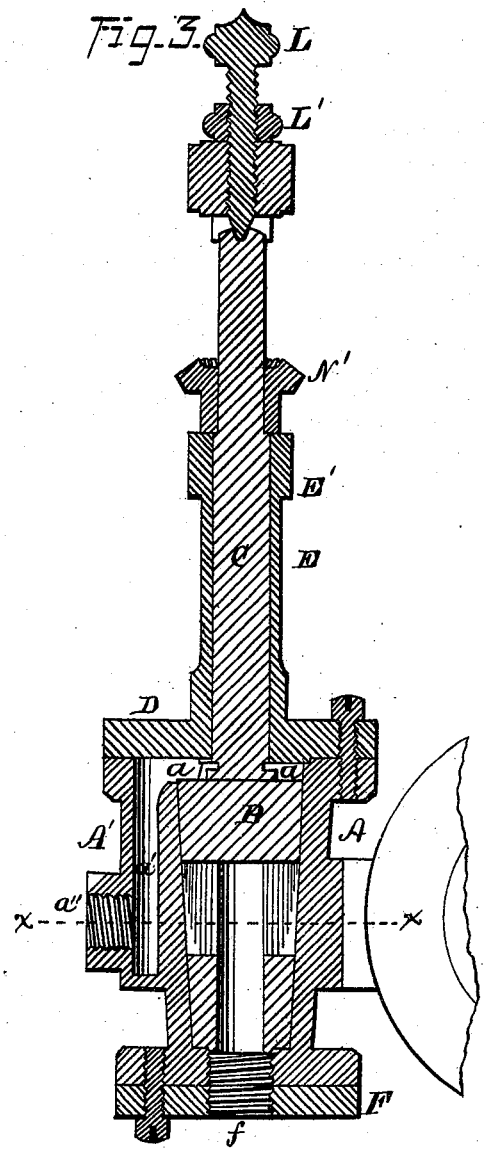
Figure 4:
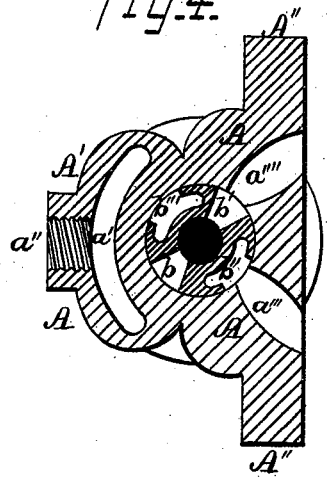

Figure 1 is a front elevation of my invention. Fig. 2 is a side elevation of the same. Fig. 3 is a central longitudinal section. Fig. 4 is a transverse section on line $x\ x$ of Fig. 3. Fig. 5 is a modification of said invention, with eduction-passages through the side of the plug.

Letters of like name and kind refer to like parts in each of the figures.

The object of my invention is the production of a cylindrical valve for use in admitting steam or compressed air to, and permitting it to escape from, a cylinder, upon the sides and ends of which the pressure of the same shall be so equalized as to enable said valve to move as easily when under pressure as when the same is removed; and it consists of the arrangement of the induction and eduction ports within the plug and its casing, substantially as and for the purpose hereinafter specified.

In the annexed drawings, A represents the casing, having a general cylindrical form exteriorly, through the center of which is formed an opening, that tapers from one end of said casing to the other. Into the said tapering opening is fitted a plug, B, that corresponds therewith in size and shape, and is provided with a stem or spindle, C, that extends outward from the center of the largest end of said plug, and in a line with the same. Fitted to and secured upon the largest end of the casing A is a head, D, provided with a sleeve, E, through the center of which is an opening corresponding in size and shape to the stem C, which opening receives said stem and furnishes a bearing for the same. The opposite end of said casing is closed by a second head, F, at the center of which is a threaded opening, $f$, for the reception of an induction-pipe. From the center of its smallest end to a point near its largest end the plug B is hollow, its interior communicating directly with the induction-opening $f$, while from its longitudinal center extend radially outward two rectangular openings, $b$ and $b'$, which have their longest axis in a line with said plug. At opposite points upon the periphery of said plug are provided depressions $b''$ and $b'''$, that correspond in size and form with the openings $b$ and $b'$, and are provided with passages, which connect the same with a chamber, $a$, that is formed within the casing A, between the larger end of the plug B and head D. An enlargement, A', is formed upon one end of the casing A, and, extending from the large end of said casing downward, is provided with a channel, $a'$, that affords communication between the chamber $a$ and eduction-port $a''$. Opposite said eduction-port is formed a flange, A'', within which are provided ports or channels $a'''$ and $a''''$, corresponding in size and shape with openings $b$ and $b'$ in the plug B, through which steam or compressed air is admitted to and discharged from the cylinder. As thus constructed, the openings or ports within the plug and casing are relatively arranged so that, when the port $b'$ corresponds with and covers the channel $a''''$, steam or compressed air is permitted to enter the cylinder at one end through said port and channel, while at the same time the depression $b''$ coincides with and covers the channel $a'''$, and affords free communication between the opposite end of the cylinder and the open air.

It will be seen that by rotating the plug B in either direction steam or compressed air will be admitted to and discharged from each end of the cylinder alternately. By admitting steam or compressed air at or through the small end of the plug B its pressure will have a tendency to decrease the friction of said plug upon its seat, and consequently the power required to operate it, as well as the wear, will be materially lessened. As, however, the pressure, if excessive, might force the plug from its seat, or, if no pressure existed, said plug might wedge firmly into its seat, it has been found necessary to employ the following-described mechanism, in order that the relative position of said plug and casing may be insured. Upon the end of the sleeve E opposite the head D is fastened a cross-head, E', through which the spindle G projects. Fastened into each end of said cross-head, and extending outward and parallel with said spindle, are two studs, H and H, which are united at their ends, opposite the cross-head, by a cross-bar, K, which corresponds in size and form with the cross-head, and is secured to said studs in the usual manner. An adjusting-screw, L, center-pointed, and provided with a check-nut, L', is tapped through the cross-bar K, and has its point contained within a corresponding recess that is formed within the end at the center of the spindle C, thus providing a means of adjustment whereby the plug may be held within its casing, and made to bear upon its seat with any desired pressure. An adjustable collar, L', is fitted upon and secured to the spindle immediately outside of the cross-head E, and, having its bearing upon the same, prevents the plug from being pressed too tight into its seat, and, in connection with the adjusting-screw L, enables said plug to be held in any desired position longitudinally. An arm, M, secured upon one of the studs H, central between the cross-head E and cross-bar K, together with the shaft N and gears N' and N', completes the device, and furnishes a means for rotating the plug or valve B.

A modified form of the plug and casing is shown in Fig. 5, the head D being omitted, and the plug in all respects the same as shown in Figs. 3 and 4, except that its eduction-passages have an opening at the side and near the large end of the same, and correspond in size and position to similar openings provided in said casing, and which lead directly to the eduction-port $a'$. It will be seen that by admitting pressure through the small end of the plug or valve it is relieved of all downward pressure, consequently great wear, friction, and loss of power, leaving to the mechanical device described the adjusting of said plug or valve to its seat.

Having thus fully set forth the nature and merits of my invention, what I claim as new is—

The relative arrangement within the casing A and plug or valve B of the ports or openings $a$, $a'$, $a''$, $a'''$, $a''''$, $b$, $b'$, $b''$, and $b'''$, respectively, substantially as and for the purpose shown.

In testimony that I claim the foregoing I have hereunto set my hand this 23d day of December, 1874.

JOHN F. SWEET.

Witnesses:
GEO. S. PRINDLE,
JOHN R. YOUNG.